Figure 1:
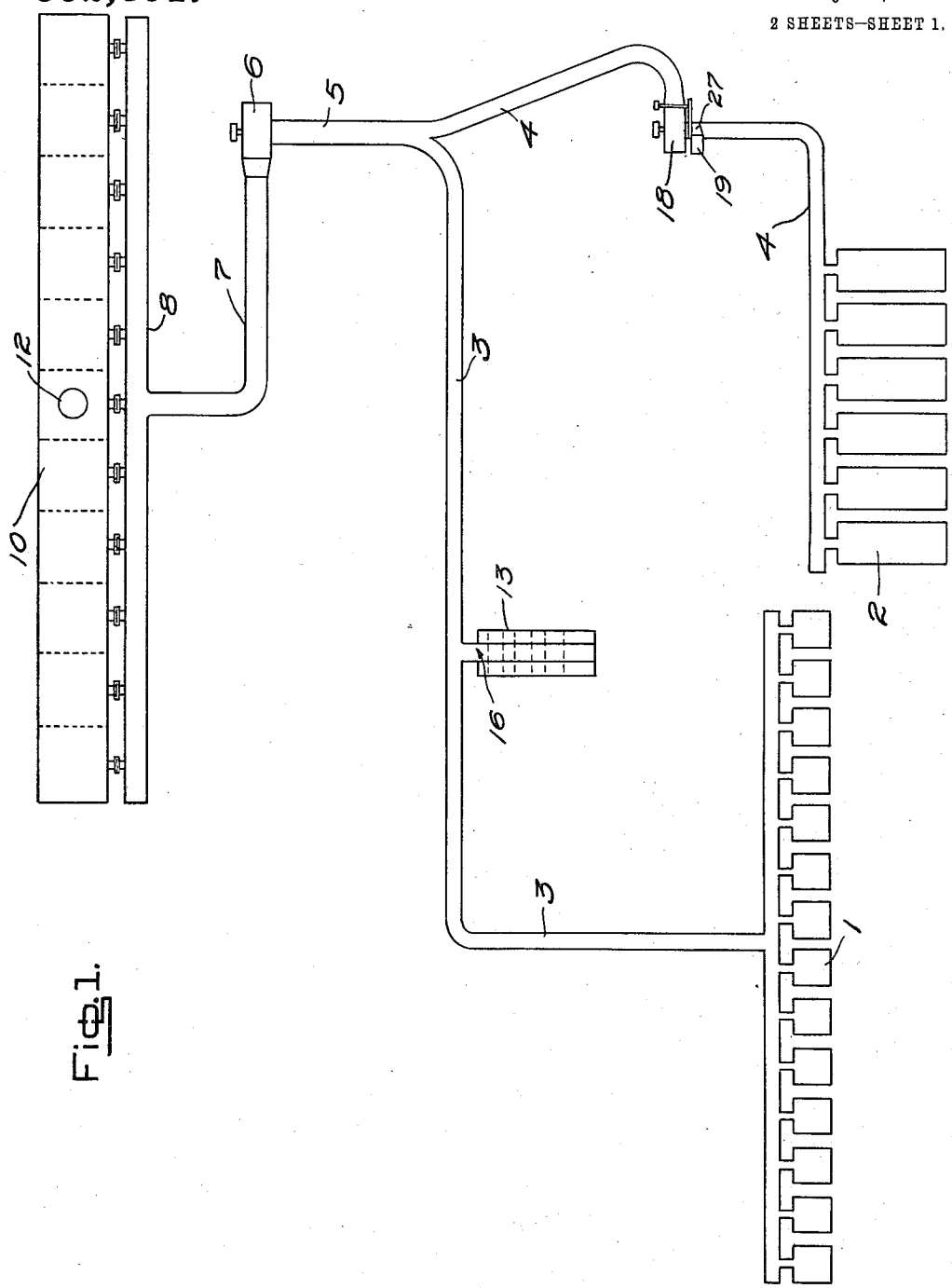

C. B. SPRAGUE.
APPARATUS FOR TREATING ACIDULOUS GASES PRODUCED IN THE SMELTING OR TREATMENT OF ORES.
APPLICATION FILED FEB. 18, 1910.

992,391.

Patented May 16, 1911.

2 SHEETS—SHEET 1.

Witnesses:
M. G. Crozier
H. D. McPhail

Inventor;
Clarence B. Sprague
by Phillips Van Everen & Fish
Attys

C. B. SPRAGUE.
APPARATUS FOR TREATING ACIDULOUS GASES PRODUCED IN THE SMELTING OR TREATMENT OF ORES.
APPLICATION FILED FEB. 18, 1910.
992,391.
Patented May 16, 1911.
2 SHEETS—SHEET 2.
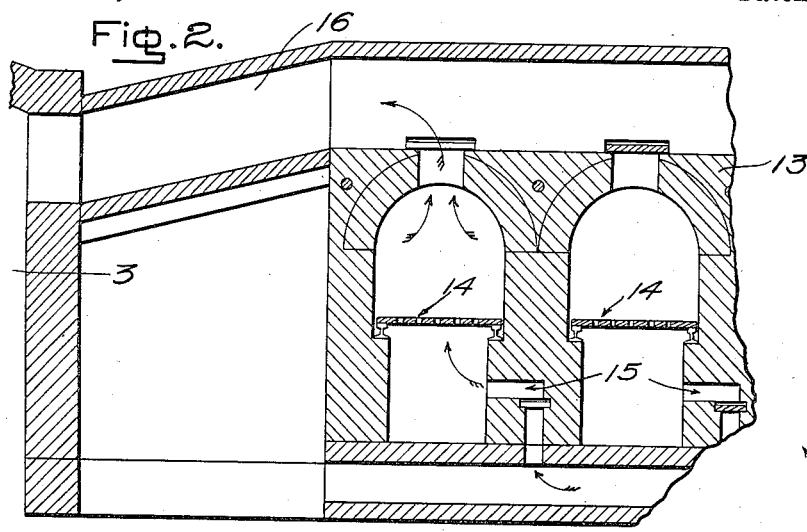
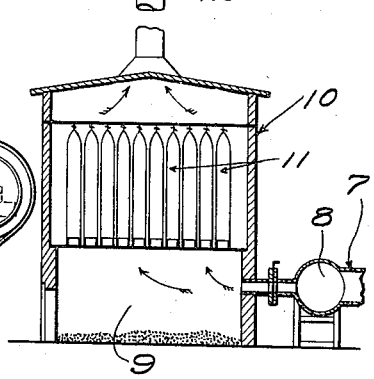
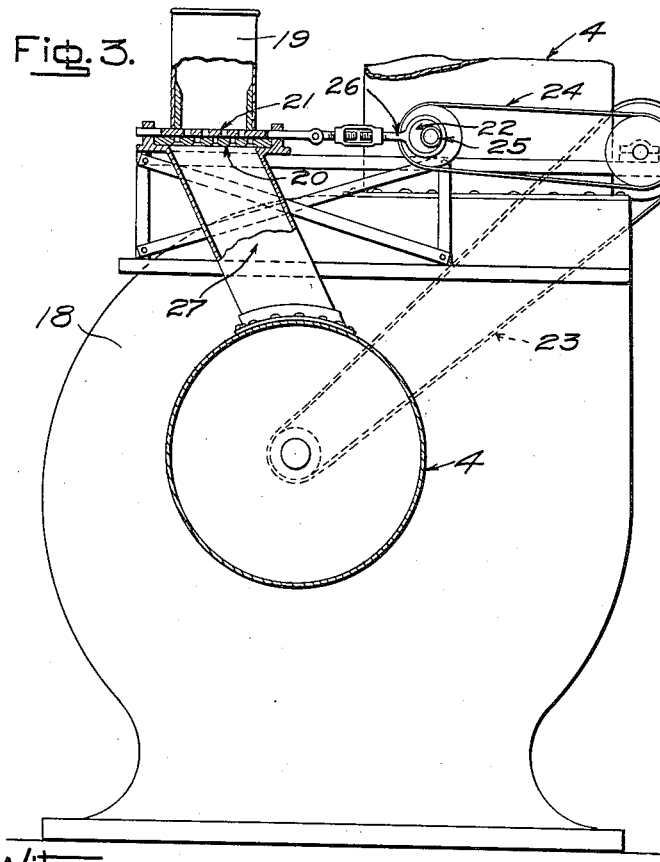
Witnesses:
M. G. Crozier.
K. D. McPhail
Inventor,
Clarence B. Sprague
by Phillips Van Everen + Fish
Attys

UNITED STATES PATENT OFFICE.

CLARENCE B. SPRAGUE, OF SALT LAKE CITY, UTAH, ASSIGNOR TO UNITED STATES SMELTING, REFINING & MINING COMPANY, OF PORTLAND, MAINE, A CORPORATION OF MAINE.

APPARATUS FOR TREATING ACIDULOUS GASES PRODUCED IN THE SMELTING OR TREATMENT OF ORES.

992,391.  Specification of Letters Patent.  Patented May 16, 1911.

Application filed February 18, 1910. Serial No. 544,608.

*To all whom it may concern:*

Be it known that I, CLARENCE B. SPRAGUE, a citizen of the United States, residing at Salt Lake City, in the county of Salt Lake and State of Utah, have invented certain new and useful Improvements in Apparatus for Treating Acidulous Gases Produced in the Smelting or Treatment of Ores; and I do hereby declare the following to be a full, clear, and exact description of the invention, such as will enable others skilled in the art to which it appertains to make and use the same.

The invention relates to ore treating plants, and more particularly to apparatus for treating the acidulous smoke or gases given off from the ore treating furnaces of such plants.

The object of the invention is to provide an apparatus or plant of this character having a novel and improved construction and mode of operation, whereby the discharge of injurious compounds into the atmosphere may be avoided, or the solid particles or fume contained in the smoke may be conveniently and economically removed so that any values therein may be recovered.

To this end the invention consists in the combinations and features of construction and arrangement of parts hereinafter described and set forth in the claims.

The various features of the invention will be understood from the accompanying drawings and the following detailed description of the apparatus illustrated therein.

In the drawings Figure 1 is a diagrammatic plan view illustrating an apparatus embodying the invention; Fig. 2 is a sectional detail showing the zinc oxid producing furnace; Fig. 3 is an elevation, partly in section, of a fan and feeder for introducing a neutralizing powder; and Fig. 4 is a vertical section through the bag house.

In Patent No. 931,515 I have described a method of treating corrosive smoke, and in its operation the apparatus of the present invention practices the method of said patent.

The apparatus illustrated in the drawings includes a battery 1 of converter roaster furnaces such as are commonly used in smelting plants, and a battery 2 of reverberatory roaster furnaces such as are also used in these smelting plants. The smoke or gases coming from these furnaces contain more or less sulfuric acid and other corrosive acid compounds, the smoke from the reverberatory roasters being more highly acid than the smoke from the converter roasters. The flues 3 and 4 leading from the converter roasters and the reverberatory roasters respectively unite in a common flue 5 through which the smoke is drawn by a fan 6. The smoke drawn through the flues by the fan is forced through a flue 7 and distributing pipe 8 into the lower chambers 9 of a bag house 10 (Fig. 4). From the chambers 9 the smoke passes up through filtering bags 11 and is discharged into the atmosphere through the chimney 12. As the smoke passes through the bags the fine solid particles or fume held in suspension therein are collected on the interior of the bags, and fall, or may be shaken down into the chamber 9, from which they may be readily removed.

Since the smoke or gases coming from the ore treating furnaces contain sulfuric acid and other acid compounds which, if brought into contact with filter bags would quickly destroy or render them unfit for use, or if discharged into the atmosphere would injure surrounding vegetation, it is essential to the satisfactory operation of the apparatus that these corrosive compounds in the smoke be neutralized before the smoke passes through the bags or is discharged into the atmosphere.

In the apparatus shown, the means for effecting the neutralization of the less acid smoke from the converter furnaces consists of a furnace 13 which is constructed and operated to produce zinc oxid fume and discharge it into the flue 3. As indicated in Fig. 2, this zinc oxid producing furnace is provided with a series of grates 14, any desired number of which may be utilized, according to the conditions under which the plant is being operated. A charge of finely ground zinc ores mixed with slack coal is placed upon a grate, and a light air blast is delivered through the passages 15 and passes up through the ignited charge on the grate. The zinc oxid thus formed floats off and is delivered through a flue 16 into the flue 3 in the form of fume. This fume is held in suspension in the smoke passing through the flue 3, and neutralizes the corrosive acid compounds in the smoke so that this smoke may be passed through the filter bags without injury thereto, or if desired, may be discharged into the air without danger of serious injury to surrounding vegetation.

In case the flue 3 connects with a flue from another furnace or battery of furnaces, such as the reverberatory roasters shown, sufficient zinc oxid may be generated in the furnace 13 to neutralize the smoke coming from these furnaces. This would involve the generation of a comparatively large amount of zinc oxid, since the smoke from these furnaces is so highly acid. It is preferred, therefore, to neutralize the highly acid smoke from the reverberatory furnaces by the devices shown in Figs. 1 and 3. These devices consist of a fan 18 through which the smoke from the reverberatory furnaces passes, and a feeder arranged to deliver powdered lime or other neutralizer into the suction side of the fan. Any suitable form of feeder may be utilized for this purpose, but it is preferred to use the feeder shown. This feeder consists of a hopper 19 for containing the neutralizer provided with a perforated bottom plate 20. The amount of neutralizing powder delivered through the discharge slots or holes in the bottom of the hopper is regulated by a reciprocating feed slide 21 arranged above the bottom plate, and provided with openings which are brought into and out of register with the openings of the bottom plate. The feed plate is reciprocated through an eccentric 22 driven through belts 23 and 24 and shaft 25 from the fan shaft. The link 26 connecting the eccentric and feed slide is made in sections connected by a turn buckle, so that the slide may be adjusted to vary the feed of neutralizing powder as desired.

The neutralizing powder passes into the suction side of the fan casing through a chute 27, and is thoroughly intermingled with acid gases or smoke from the reverberatory furnaces by the fan, so that it is held in suspension in and neutralizes the smoke more or less completely. By connecting the flue 5 with the flue 3 from the furnace 13, any traces of corrosive acid which might otherwise remain in the smoke will be neutralized in the flue 5 by the zinc oxid fume contained in the smoke coming through the flue 3, and a complete neutralization of the highly acid gases from the reverberatory furnace will be insured. This smoke therefore, may be passed through the filter bags without injury thereto, or discharged into the atmosphere without danger of serious injury to the surrounding vegetation.

While the invention has been illustrated and described in connection with an apparatus in which the ore treating furnaces are roaster furnaces, it will be understood that the invention is not confined in its application to apparatus in which this type of furnace is employed, but may be utilized in connection with other forms of ore treating furnaces giving off acidulous smoke or gases.

It will also be understood that various features of the invention may be embodied in apparatus which does not contain all the features of the invention, and that the specific construction and arrangement of parts shown and described is not essential, except so far as set forth in the claims.

Having explained the nature and object of the invention, and specifically described one form of apparatus in which it may be embodied, what I claim is:—

1. An apparatus of the character described comprising an ore treating furnace giving off acidulous smoke or gases, a bag house containing filtering bags, flues for conveying the smoke from the furnace to the bags, a fan included in the flues, and a feeder for delivering a powdered neutralizer into the suction side of the fan, substantially as described.

2. An apparatus of the character described comprising an ore treating furnace giving off acidulous smoke or gases, a bag house containing filtering bags, flues for conveying the smoke from the furnace to the bags, a fan included in the flues, a feeder for delivering a powdered neutralizer into the suction side of the fan, and a zinc oxid producing furnace for discharging zinc oxid fume into the flues between the fan and bags, substantially as described.

3. An apparatus of the character described comprising two batteries of ore treating furnaces giving off acidulous smoke or gases, a bag house containing filtering bags, flues for conveying the smoke from the respective batteries of furnaces to the bags, a fan included in the flue from one battery of furnaces, a feeder for feeding a powdered neutralizer into the suction side of the fan, and a zinc oxid producing furnace for discharging zinc oxid fume into the flue from the other battery of furnaces, substantially as described.

4. An apparatus of the character described comprising an ore treating furnace giving off acidulous smoke or gases, a bag house containing filtering bags, flues for conveying the smoke from the furnace to the bags, and a zinc oxid producing furnace for discharging zinc oxid fume into the flues, substantially as described.

5. An apparatus of the character described comprising an ore treating furnace giving off acidulous smoke or gases, a bag house containing filtering bags, flues for conveying the smoke from the furnace to the bags, a fan included in the flues, a hopper for neutralizing powder connected with the suction side of the fan and having a perforated bottom and perforated feed slide above said bottom, and means for reciprocating the feed slide to deliver regulated quantities of neutralizer to the fan, substantially as described.

6. An apparatus of the character described comprising an ore treating furnace giving off acidulous smoke or gases, a flue through which the smoke is discharged, and a zinc oxid producing furnace for discharging zinc oxid fume into the flue, substantially as described.

7. An apparatus of the character described comprising an ore treating furnace giving off acidulous smoke or gases, flues through which the acidulous smoke is discharged, a fan included in the flues, and a feeder for delivering a powdered neutralizer into the fan, substantially as described.

8. An apparatus of the character described comprising an ore treating furnace giving off acidulous smoke or gases, flues through which the acidulous smoke is discharged, a fan included in the flues, a feeder for delivering a powdered neutralizer into the suction side of the fan, and a zinc oxid producing furnace for discharging zinc oxid fume beyond the fan, substantially as described.

CLARENCE B. SPRAGUE.

Witnesses:
R. H. BUTTERFIELD,
ANDREW HOWAT.